(12) United States Patent
Takahashi

(10) Patent No.: US 12,053,965 B2
(45) Date of Patent: Aug. 6, 2024

(54) DECORATIVE SHEET AND DECORATIVE PLATE

(71) Applicant: TOPPAN INC., Tokyo (JP)

(72) Inventor: Shinichi Takahashi, Tokyo (JP)

(73) Assignee: TOPPAN INC., Tokyo (JP)

( * ) Notice: Subject to any disclaimer, the term of this patent is extended or adjusted under 35 U.S.C. 154(b) by 0 days.

(21) Appl. No.: 17/986,334

(22) Filed: Nov. 14, 2022

(65) Prior Publication Data

US 2023/0082755 A1    Mar. 16, 2023

Related U.S. Application Data

(63) Continuation of application No. PCT/JP2021/011991, filed on Mar. 23, 2021.

(30) Foreign Application Priority Data

May 18, 2020    (JP) .................................. 2020-086914

(51) Int. Cl.
*B23B 3/00*    (2006.01)
*B32B 15/12*    (2006.01)
(Continued)

(52) U.S. Cl.
CPC .............. *B32B 29/06* (2013.01); *B32B 15/12* (2013.01); *B32B 21/06* (2013.01); *E04F 13/002* (2013.01); *E04F 13/0871* (2013.01); *B32B 2255/12* (2013.01); *B32B 2255/26* (2013.01); *B32B 2255/28* (2013.01); *B32B 2307/4023* (2013.01); *B32B 2307/536* (2013.01); *B32B 2307/584* (2013.01); *B32B 2307/718* (2013.01); *B32B 2307/724* (2013.01); *B32B 2307/748* (2013.01); *B32B 2451/00* (2013.01)

(58) Field of Classification Search
CPC ... B32B 15/12; B32B 27/10; B32B 2307/718; B32B 2307/724
See application file for complete search history.

(56) References Cited

U.S. PATENT DOCUMENTS

| 10,213,982 B2* | 2/2019 | Oshima ................. B32B 27/308 |
| 10,589,498 B2* | 3/2020 | Oshima ................. B32B 21/06 |
| 2018/0215122 A1 | 8/2018 | Oshima et al. |

FOREIGN PATENT DOCUMENTS

| EP | 3 543 010 A1 | 9/2019 |
| JP | 2007-023446 A | 2/2007 |

(Continued)

OTHER PUBLICATIONS

JP-2007023446-A (Year: 2007).*

(Continued)

*Primary Examiner* — Elizabeth E Mulvaney
(74) *Attorney, Agent, or Firm* — Foley & Lardner LLP

(57) ABSTRACT

A pattern layer formed on a sheet base material, a first surface protective layer formed on the pattern layer, and a second surface protective layer partially formed on the first surface protective layer. The first surface protective layer and the second surface protective layer each have a gloss different to each other. The sheet base material is a thin paper that has a T-type peeling strength of 130 gf/15 mm or more and 210 gf/15 mm or less and an air permeability in accordance with JIS P 8117 of 150 seconds or more.

13 Claims, 1 Drawing Sheet

(51) Int. Cl.
    *B32B 21/06*      (2006.01)
    *B32B 29/06*      (2006.01)
    *E04F 13/00*      (2006.01)
    *E04F 13/08*      (2006.01)

(56) References Cited

FOREIGN PATENT DOCUMENTS

| | | |
|---|---|---|
| JP | 2007-136766 A | 6/2007 |
| JP | 2015-077709 A | 4/2015 |
| JP | 2017-136766 A | 8/2017 |
| JP | 2017-165030 A | 9/2017 |
| WO | WO-2017/018276 A1 | 2/2017 |

OTHER PUBLICATIONS

International Searching Authority, "International Search Report," issued in connection with International Patent Application No. PCT/JP2021/011991, dated Jun. 22, 2022.

International Searching Authority, "Written Opinion," issued in connection with International Patent Application No. PCT/JP2021/011991, dated Jun. 22, 2022.

Decorative Sheet and Decorative Plate, Oct. 5, 2020.

Office Action issued in corresponding Japanese Patent Application No. 2020-086914 dated Oct. 10, 2023 (10 pages).

European Extended Search Report issued in corresponding European Patent Application No. 21809374.8 dated Oct. 5, 2023 (8 pages).

\* cited by examiner

DECORATIVE SHEET AND DECORATIVE PLATE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/011991, filed on Mar. 23, 2021, which in turn claims the benefit of JP 2020-086914, filed May 18, 2020 the disclosures of all which are incorporated herein by reference in its entirety.

TECHNICAL FIELD

The present invention relates to a decorative sheet and a decorative plate.

BACKGROUND ART

Conventionally, as a decorative sheet, a technique described in Patent Literature 1, for example, is known. This decorative sheet described in Patent Literature 1 includes a pattern layer formed on a sheet base material, a first surface protective layer formed on the pattern layer, and a second surface protective layer partially formed on the first surface protective layer, in which the first surface protective layer contains a thermosetting resin having a urethane bond, and the second surface protective layer contains either a thermosetting resin having a urethane bond or an ionizing radiation curable resin. The second surface protective layer covers 0.1% or more and 30% or less of the area of the first surface protective layer, and the gloss of the first surface protective layer is higher than the gloss of the second surface protective layer. Thus, in the decorative sheet of Patent Literature 1, the first surface protective layer is formed with a resin having high hardness and has a high gloss, and the second surface protective layer is formed with a resin capable of exerting a visual stereoscopic effect without being affected by the gloss of the first surface protective layer even when formed on the first surface protective layer. Therefore, the exposure of the first surface protective layer on the surface of the decorative sheet provides a decorative sheet that is excellent in scratch resistance and stain resistance and that maintains a visual stereoscopic effect.

[Citation List] [Patent Literature] [PTL 1] JP 2007-136766 A

SUMMARY OF THE INVENTION

Technical Problem

However, in the technique described in Patent Literature 1, the sheet base material has the risk of being susceptible to gouging and denting under heavy loads, and the scratch resistance may become low.

The present invention has been made in view of such issues. An object of the present invention is to provide a decorative sheet and a decorative plate which are excellent in scratch resistance while maintaining a visual stereoscopic effect.

Solution to Problem

For solving the above-described problem, a decorative sheet according to an aspect of the present invention includes a pattern layer formed on a sheet base material, a first surface protective layer formed on the pattern layer, and a second surface protective layer partially formed on the first surface protective layer, in which the first surface protective layer and the second surface protective layer each have a gloss different to each other, and the sheet base material is a thin paper that has a T-type peeling strength of 130 gf/15 mm or more and 210 gf/15 mm or less and an air permeability in accordance with JIS P 8117 of 150 seconds or more.

Also, a decorative plate according to the present invention is formed by bonding the above-described decorative sheet to a substrate.

Advantageous Effects of the Invention

According to the decorative sheet and the decorative plate according to an aspect of the present invention, since the second surface protective layer is formed with a resin capable of exerting a visual stereoscopic effect without being affected by the gloss of the first surface protective layer even when formed on the first surface protective layer, a visual stereoscopic effect can be maintained by the first surface protective layer exposed on the surface of the decorative sheet and the decorative plate. Furthermore, since the sheet base material is configured to be unsusceptible to gouging and denting under heavy loads, scratch resistance is excellent.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

Decorative Plate of First Embodiment

Figure 1:
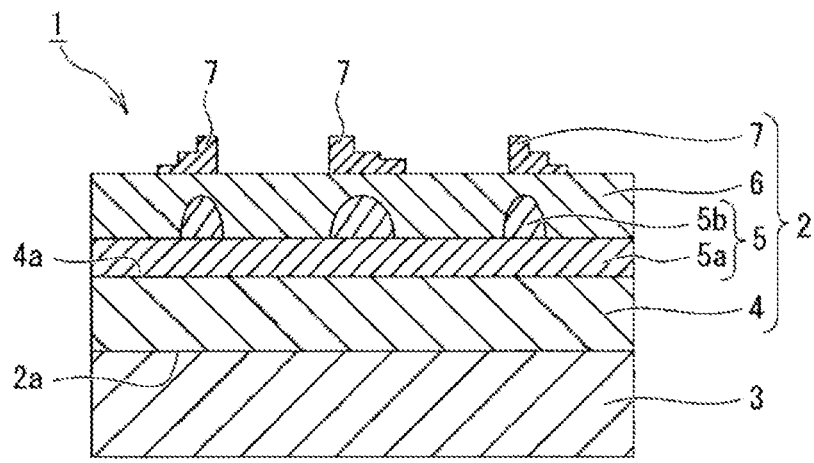
FIG. 1 is a cross-sectional view of a decorative plate according to a first embodiment of the present invention.

As illustrated in FIG. 1, a decorative plate 1 of the first embodiment is suitable for interior use such as a sliding door which occupies a large area. The decorative plate 1 is formed by bonding a substrate 3 to one surface (hereinafter, referred to as a back surface 2a) of a decorative sheet 2.

The decorative sheet 2 is formed by laminating a sheet base material 4, a pattern layer 5, a first surface protective layer 6, and a second surface protective layer 7 in this order. The sheet base material 4 and the substrate 3 are bonded together.

[Sheet Base Material]

The sheet base material 4 is formed of a thin paper in which thin fibers are entangled with each another. The sheet base material 4 has a T-type peeling strength of 130 gf/15 mm or more and 210 gf/15 mm or less. When the sheet base material 4 has a T-type peeling strength of less than 130 gf/15 mm, gouging or denting are likely to occur under heavy loads, which causes a problem in terms of scratch resistance of the decorative sheet 2. When the sheet base material 4 has a T-type peeling strength of more than 210 gf/15 mm, cracks or cuts are likely to occur, which causes a problem in terms of scratch resistance.

The sheet base material 4 has an air permeability in accordance with JIS P 8117 of 150 seconds or more. When the sheet base material 4 has an air permeability of less than 150 seconds, gouging or denting are likely to occur under heavy loads, which causes a problem in terms of scratch resistance.

Also, the sheet base material 4 has a basis weight of 20 g/m$^2$ or more. When the sheet base material 4 has a basis weight of less than 20 g/mm$^2$, the decorative sheet 2 having excellent scratch resistance cannot be obtained, which causes a problem in terms of scratch resistance.

[Pattern Layer]

The pattern layer 5 is formed by printing on a surface 4a of the sheet base material 4 and is intended to add a pattern for imparting designability. Any pattern, such as wood grain, cork, pebble grain, tile, pottery, or abstract pattern, can be selected, as long as it is suitable for a place where the decorative sheet 2 is used. The pattern layer 5 is formed by laminating, on the surface 4a of the sheet base material 4, a pattern ink layer 5a that covers the entire surface 4a and serves as a base color of a pattern, and a vessel ink layer 5b to depict a pattern other than the base color, which are arranged in this order. Examples of the printing ink include, as a pigment, isoindolinone yellow, polyazo red, phthalocyanine blue, carbon black, iron oxide, titanium oxide, and a mixture thereof. Examples of the solvent include ethyl acetate, n-butyl acetate, isobutanol, and methyl isobutyl ketone.

[First Surface Protective Layer]

The first surface protective layer 6 is a sheet-like layer that is formed on the pattern layer 5 and covers the entire pattern layer 5. The first surface protective layer 6 is formed of a material (resin) that is transparent or translucent enough to allow a pattern of the pattern layer 5 to be seen through the first surface protective layer 6. The material of the first surface protective layer 6 is preferably, for example, a thermosetting resin. Considering adhesiveness of the second surface protective layer 7, and deformation-following properties and scratch resistance of the decorative sheet 2, a thermosetting resin (binder) having a urethane bond, such as a two-part curable urethane resin, may be preferably used as the thermosetting resin. It is noted that no matting agent such as silica particles is added to the thermosetting resin. Examples of the solvent include ethyl acetate and n-butyl acetate.

An example of the two-part curable urethane resin is a urethane resin containing a polyol as a main body and an isocyanate as a crosslinking agent (curing agent). Examples of the polyol include those having two or more hydroxyl groups in the molecule, such as polyethylene glycols, polypropylene glycols, acrylic polyols, polyester polyols, polyether polyols, polycarbonate polyols, and polyurethane polyols.

As the isocyanate, a polyvalent isocyanate having two or more isocyanate groups in the molecule can be used. Examples thereof include aromatic isocyanates such as 2,4-tolylene diisocyanate, xylene diisocyanate, and 4,4'-diphenylmethane diisocyanate, or aliphatic (or alicyclic) isocyanates such as 1,6-hexamethylene diisocyanate, isophorone diisocyanate, hydrogenated tolylene diisocyanate, and hydrogenated diphenylmethane diisocyanate. Adducts or multimers of the above-described various isocyanates can also be used. Examples thereof include an adduct of tolylene diisocyanate and tolylene diisocyanate trimer. Out of the above-described isocyanates, the aliphatic (or alicyclic) isocyanates are preferable because weather resistance and thermal yellowing resistance are favorable. For example, 1,6-hexamethylene diisocyanate can be used.

In this manner, no matting agent is added to the first surface protective layer 6. Accordingly, the amount of light reflected by the first surface protective layer 6 is larger and have a higher gloss (luster) than that of the second surface protective layer 7 to which the gloss (luster) to be described later is to be added. Therefore, the second surface protective layer 7 provides different degrees of gloss on the surface of the decorative sheet 2, and thus a visual stereoscopic effect by means of optical illusion is exerted.

Also, since the first surface protective layer 6 contains a thermosetting resin having a urethane bond, i.e., a resin having high hardness, the scratch resistance of the decorative sheet 2 can be improved by the first surface protective layer 6 exposed on the surface. Furthermore, since the gloss (luster) of the first surface protective layer 6 is higher than the gloss (luster) of the second surface protective layer 7, the surface of the first surface protective layer 6 is increased in smoothness and thus is increased in fingerprint resistance, which improves the stain resistance of the decorative sheet 2. The effect of improving the stain resistance can be obtained even if the applied amount of the first surface protective layer 6 is low. In addition, a painting pattern (such as a wood grain pattern), which is popular in the United States and other countries, can be depicted. Furthermore, since the first surface protective layer 6 has less white turbidity, a more delicate and transparent design pattern can be depicted.

[Second Surface Protective Layer]

The second surface protective layer 7 is partially formed on the first surface protective layer 6 and covers a part (for example, a part facing the printing ink of the vessel ink layer 5*b*) of the first surface protective layer 6. This allows the wood grain vessel ink layer 5*b* to be visually depicted. The second surface protective layer 7 covers, for example, 0.1% or more of the area of the first surface protective layer 6. In the present embodiment, the first surface protective layer 6 is high in scratch resistance and stain resistance. Therefore, the decorative sheet 2 is excellent in scratch resistance and stain resistance even when the area of the second surface protective layer 7 is small.

The second surface protective layer 7 is formed of a material (resin) that is transparent or translucent enough to allow a pattern of the pattern layer 5 to be seen through the second surface protective layer 7 and the first surface protective layer 6. As the material of the second surface protective layer 7, a thermosetting resin, for example, can be used in the same manner as the first surface protective layer 6. Considering adhesiveness to the first surface protective layer 6 and deformation-following properties and scratch resistance of the decorative sheet 2, a thermosetting resin having a urethane bond, such as a two-part curable urethane resin, may be preferable as the thermosetting resin. It is noted that a matting agent such as silica particles is added to the thermosetting resin. This allows the gloss of the first surface protective layer 6 to be higher than the gloss of the second surface protective layer 7. Examples of the solvent include ethyl acetate and n-butyl acetate. The upper limit of the area of the second surface protective layer 7 is 30% or less of the area on the first surface protective layer 6.

The shape of the second surface protective layer 7 is not particularly limited and may be a regularly aligned definite shape such as circle, square, or hexagon, or may be an indefinite pattern shape. The shape may be synchronized with the pattern of the pattern layer 5, whereby the pattern looks more realistic.

The second surface protective layer 7 may have gradation, i.e., a high and low gloss (luster). For example, the thickness of the second surface protective layer 7 is increased at places where the gloss (luster) is high, and the thickness of the first surface protective layer 6 is decreased at places where the gloss (luster) is low. This allows portions of the second surface protective layer 7 to have a high and low gloss (luster). Thus, each portion of the second surface protective layer 7 can have different gloss to each other to appropriately exert a visual stereoscopic effect.

In this manner, the second surface protective layer 7 is formed of a thermosetting resin having a urethane bond, i.e., a resin that is not influenced by the gloss of the lower layer (the first surface protective layer 6). Accordingly, the first surface protective layer 6 and the second surface protective layer 7 can appropriately exert a visual stereoscopic effect. In addition, since the thermosetting resin having a urethane bond has high hardness, the scratch resistance of the decorative sheet 2 can be enhanced.

It is noted that although a thermosetting resin was used as a binder in the present embodiment, another configuration can also be adopted. For example, an ionizing radiation curable resin may be used. A preferable example of the ionizing radiation curable resin is an ultraviolet curable resin. Examples of the ultraviolet curable resin include a (meth) acrylic-based resin, a silicone-based resin, a polyester-based resin, a urethane-based resin, an amide-based resin, and an epoxy-based resin. This can improve the hardness of the second surface protective layer 7, i.e., the outermost layer of the decorative sheet 2, which improves surface physical properties, such as wear resistance, scratch resistance, and solvent resistance, of the decorative sheet 2. Alternatively, for example, a mixture of the thermosetting resin and the ionizing radiation curable resin may be used as a binder.

Although silica particles were used as a matting agent (luster adjuster) in the present embodiment, another configuration can also be adopted. Examples thereof include particles of inorganic matter such as alumina (such as α-alumina), calcium carbonate, barium sulfate, kaolinite, and aluminosilicate, or particles of organic material such as polycarbonate, nylon, and urethane resin.

[Substrate]

The substrate 3 is a plate-like member made of metal or wood. Examples of the metal-based member include aluminum, steel, stainless steel, and a composite panel. The composite panel includes, for example, a resin layer that serves as a core material and metal plates (aluminum, galvalume, stainless steel, etc.) bonded to both surfaces of the resin layer. Examples of the wood-based member include MDF (medium density fiberboard), plywood, and particle board.

Effects of First Embodiment

The invention according to the first embodiment has the following advantageous effects.

The decorative sheet 2 according to the present embodiment includes the pattern layer 5 formed on the sheet base material 4, the first surface protective layer 6 formed on the pattern layer 5, and the second surface protective layer 7 partially formed on the first surface protective layer 6. The first surface protective layer 6 contains a thermosetting resin having a urethane bond. The second surface protective layer 7 contains either a thermosetting resin having a urethane bond or an ionizing radiation curable resin. The second surface protective layer 7 covers 0.1% or more and 30% or less of the first surface protective layer 6. The gloss of the first surface protective layer 6 is higher than the gloss of the second surface protective layer 7.

In this manner, the first surface protective layer 6 is formed with a resin having high hardness and also high in gloss, and the second surface protective layer 7 is formed with a resin capable of exerting a visual stereoscopic effect without being affected by the gloss of the first surface protective layer 6 even when formed on the first surface protective layer 6. Accordingly, the first surface protective layer 6 exposed on the surface of the decorative sheet 2 can provide the decorative sheet 2 that is excellent in scratch resistance and that maintains a visual stereoscopic effect.

In the decorative sheet 2 according to the present embodiment, the gloss of the second surface protective layer 7 has gradation. Such a configuration allows portions of the second surface protective layer 7 to have different degrees of gloss (luster). Thus, portions of the second surface protective layer 7 can have gloss differences to appropriately exert a visual stereoscopic effect.

In the decorative sheet 2 according to the present embodiment, the sheet base material 4 is a thin paper that has a T-type peeling strength of 130 gf/15 mm or more and 210 gf/15 mm or less, an air permeability in accordance with JIS P 8117 of 150 seconds or more, and a basis weight of 20 g/m² or more. Such a configuration enables the decorative sheet 2 to be unsusceptible to gouging and denting under heavy loads.

In the decorative sheet 2 according to the present embodiment, the first surface protective layer 6 contains a thermosetting resin having a urethane bond, and silica particles. Such a configuration improves adhesiveness to another layer such as the pattern layer 5 or the second surface protective layer 7 and deformation-following properties and scratch resistance of the decorative sheet 2.

The decorative plate 1 according to the present embodiment is formed by bonding the decorative sheet 2 to the substrate 3. Such a configuration provides a decorative plate 1 which is excellent in scratch resistance while maintaining a visual stereoscopic effect.

Decorative Plate of Second Embodiment

Figure 2:
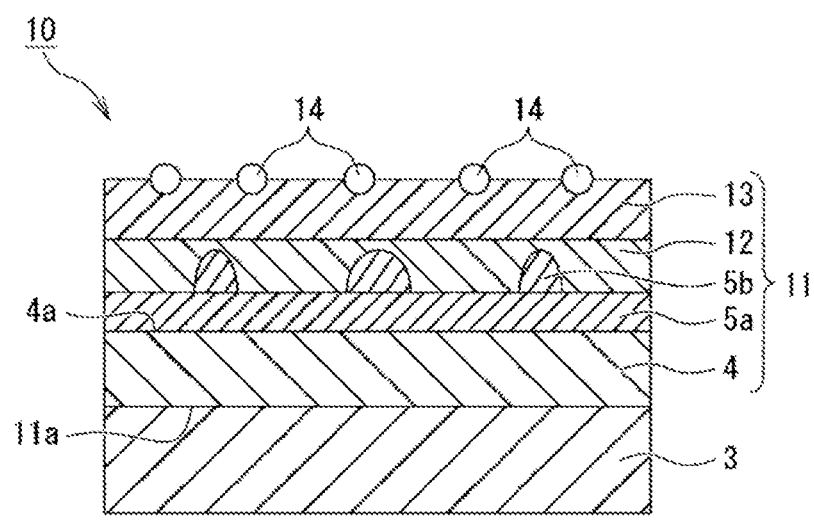
FIG. 2 is a cross-sectional view of a decorative plate according to a second embodiment of the present invention.

FIG. 2 illustrates a decorative plate 10 of the second embodiment. As described herein, components identical with those of the decorative plate 1 according to the first embodiment illustrated in FIG. 1 are given the same reference signs.

The decorative plate 10 of the present embodiment is formed by bonding a substrate 3 to one surface (hereinafter, referred to as a back surface 11a) of a decorative sheet 11.

The decorative sheet 11 is formed by laminating a sheet base material 4, a pattern layer 5, a matting layer 12, and a first surface protective layer 13 in this order. The sheet base material 4 and the substrate 3 are bonded together. The coefficient of static friction of the surface of the decorative sheet 11 is set to 0.11 to 0.15.

[Sheet Base Material]

The sheet base material 4 according to the present embodiment is also a thin paper that has a T-type peeling strength of 130 gf/15 mm or more and 210 gf/15 mm or less, an air permeability in accordance with JIS P8117 of 150 seconds or more, and a basis weight of 20 g/m² or more.

[Pattern Layer]

The pattern layer 5 is formed by printing on a surface 4a of the sheet base material 4 and is intended to add a pattern for imparting designability. The pattern layer 5 of the present embodiment is also formed by laminating, on the surface 4a of the sheet base material 4, a pattern ink layer 5a that covers the entire surface 4a and serves as a base color of a pattern, and a vessel ink layer 5b to depict a pattern other than the base color, in this order.

[Matting Layer]

The matting layer 12 contains a matting agent which reflects 1% or more and 4% or less of light inputted thereinto at 60°. The first surface protective layer 13 described later preferably reflects 5% or more and 10% or less of light inputted thereinto at 60°. The matting layer 12 may be disposed on the entire surface for the purpose of controlling the luster state of the surface of the decorative sheet 11 or may be disposed in a pattern-like manner for the purpose of imparting designability of a luster varying pattern. However, in the latter case, when the matting layer 12 is disposed on a pattern of the pattern layer 5, a difference in the luster state can be clearly emphasized to achieve designability in which a luster variation is high. Also, when the luster variation is synchronized with the pattern layer 5, it is even more effective in terms of designability. As the matting agent, an extender pigment is suitably used to create a matte state when viewed from the surface. The type of the extender pigment is not particularly limited as long as it is coarse particles having a particle size of at least 1 μm or more and preferably about 5 μm or more and 20 μm or less.

[First Surface Protective Layer]

The first surface protective layer 13 is a sheet-like layer that is formed on the pattern layer 5 and covers the entire pattern layer 5. The first surface protective layer 13 is formed of a material (resin) that is transparent or translucent enough to allow a pattern of the pattern layer 5 to be seen through the first surface protective layer 13.

The first surface protective layer 13 is a sheet-like layer that covers the entire pattern layer 5. The first surface protective layer 13 is formed of a material (resin) that is transparent or translucent enough to allow a pattern of the pattern layer 5 to be seen through the first surface protective layer 13. The material of the first surface protective layer 13 is preferably, for example, a thermosetting resin. A thermosetting resin (binder) having a urethane bond, such as a two-part curable urethane resin, is preferably used. It is noted that no matting agent such as silica particles is added to the thermosetting resin. Examples of the solvent include ethyl acetate and n-butyl acetate.

An example of the two-part curable urethane resin is a urethane resin containing a polyol as a main body and an isocyanate as a crosslinking agent (curing agent). Examples of the polyol include those having two or more hydroxyl groups in the molecule, such as polyethylene glycols, polypropylene glycols, acrylic polyols, polyester polyols, polyether polyols, polycarbonate polyols, and polyurethane polyols.

As the isocyanate, a polyvalent isocyanate having two or more isocyanate groups in the molecule can be used. Examples thereof include aromatic isocyanates such as 2,4-tolylene diisocyanate, xylene diisocyanate, and 4,4'-diphenylmethane diisocyanate, or aliphatic (or alicyclic) isocyanates such as 1,6-hexamethylene diisocyanate, isophorone diisocyanate, hydrogenated tolylene diisocyanate, and hydrogenated diphenylmethane diisocyanate. Adducts or multimers of the above-described various isocyanates can also be used. Examples thereof include an adduct of tolylene diisocyanate and tolylene diisocyanate trimer. Out of the above-described isocyanates, the aliphatic (or alicyclic) isocyanates are preferable because weather resistance and thermal yellowing resistance are favorable. For example, 1,6-hexamethylene diisocyanate can be used.

Also, since the first surface protective layer 13 contains a thermosetting resin having a urethane bond, i.e., a resin having high hardness, the first surface protective layer 13 exposed on the surface of the decorative sheet 11 can improve the scratch resistance of the decorative sheet 11.

The first surface protective layer 13 contains inorganic particles or synthetic resin particles 14, having an average particle size of 40 μm to 80 μm. The inorganic particles or synthetic resin particles 14 are exposed on the surface of the decorative sheet at an area ratio of 10% to 20%. As the inorganic particles or synthetic resin particles 14, inorganic particles such as α-alumina, chromium oxide, iron oxide, diamond, or organic resin beads such as crosslinked acrylic acid can be used.

Effects of Second Embodiment

The invention according to the second embodiment has the following advantageous effects.

The decorative sheet 11 according to the present embodiment includes the pattern layer 5 formed on the sheet base material 4, the first surface protective layer 13 formed on the pattern layer 5, and the inorganic particles or synthetic resin particles 14, having an average particle size of 40 μm or more and 80 μm or less contained in the first surface protective layer 13. The first surface protective layer 13 reflects 5% or more and 10% or less of light inputted thereinto at 60°. The decorative sheet 11 further includes, between the first surface protective layer 13 and the pattern layer 5, the matting layer 12 which contains as a matting agent a coarse extender pigment having a particle size of 5 μm or more and 20 μm or less. The matting layer 12 reflects 1% or more and 4% or less of light inputted thereinto at 60°. Such a configuration provides a decorative sheet 11 that maintains a visual stereoscopic effect.

Furthermore, since the sheet base material 4 of the decorative sheet 11 according to the present embodiment is also a thin paper that has a T-type peeling strength of 130 gf/15 mm or more and 210 gf/15 mm or less, an air permeability in accordance with JIS P 8117 of 150 seconds or more, and a basis weight of 20 g/m² or more, the decorative sheet 11 is unsusceptible to gouging and dents under heavy loads.

Since the decorative plate 10 according to the present embodiment is formed by bonding the decorative sheet 11 to the substrate 3, there can be provided a decorative plate that is excellent in scratch resistance while maintaining a visual stereoscopic effect.

Next, the present invention will be further specifically described by illustrating decorative plates of Example and Comparative Example. It is noted that as the decorative plates of the Example and the Comparative Example, the decorative plate 10 of the second embodiment illustrated in FIG. 2 is used.

Example

A sheet base material constituting the decorative plate of the Example is a thin paper that has a T-type peeling strength of 185 gf/15 mm, an air permeability in accordance with JIS P 8117 of 182 seconds, and a basis weight of 45 g/m² or more.

On the sheet base material of the Example, a pattern layer is formed by sequentially printing a monochrome solid layer and a three-colored wood grain pattern layer, with a nitrocellulose-based gravure printing ink. The monochrome solid layer serves as base coloring and as a layer which imparts concealing properties. The three-colored wood grain pattern layer has a vessel pattern. Next, the ultraviolet curable resin was coated on the entire surface of the pattern layer so as to be 3.0 g/m² after drying, thereby providing a matting layer. Then, an ultraviolet curable resin containing inorganic particles or synthetic resin particles, having an average particle size of 40 μm or more and 80 μm or less is applied by a gravure method on the surface of the matting layer at an area ratio of 20% to form a first surface protective layer. Then, this decorative sheet was bonded to a substrate to form the decorative plate of the Example. This decorative plate of the Example is a decorative plate in which gradation of the luster state in the outline portion of the vessel pattern allows excellent designability having unevenness of vessel grooves which is analogous to natural vessels.

Comparative Example

The decorative plate of the Comparative Example was formed by a method similar to that of the Example, except that the sheet base material was a thin paper having a T-type peeling strength of 86 gf/15 mm, an air permeability in accordance with JIS P 8117 of 45 seconds, and a basis weight of 45 g/m2.

<Evaluation Assessment>

The scratch resistance of the above-described decorative plates of the Example and the Comparative Example was evaluated by the Hoffman scratch test, the pencil hardness test, and the coin scratch test. The result is illustrated in Table 1.

In the Hoffman scratch test, the decorative plate was scratched under loads in 100-g increments from 100 g to 1600 g using a Hoffman scratch hardness tester. The scratch resistance was evaluated as "Poor" when the minimum load under which the ink or the base paper was gouged and fibers or substrates of the decorative sheet was exposed is 500 g or less, and was evaluated as "Good" when the minimum load was 600 g or more.

In the pencil hardness test, the decorative plate was scratched with a pencil (3B to 3H) under a load of 1000 g at an angle of 45 degrees using a pencil scratch hardness tester (manufactured by Toyo Seiki Seisaku-sho, Ltd.) (in accordance with JIS K-5600, except that the load was 1000 g). The scratch resistance was evaluated as "Poor" when the minimum hardness was B or lower at the occurrence of dents of the decorative plate, and evaluated as "Good" when the minimum hardness was H or higher.

In the coin scratch test, the surface of the decorative sheet was scratched with a 10-yen coin tilted at a tilt angle of 45 degrees under loads in 250 g increments from 250 g to 2000 g using a pencil scratch hardness tester (manufactured by Toyo Seiki Seisaku-sho, Ltd.). The scratch resistance was evaluated as "Poor" when the minimum load under which the ink or the base paper was gouged and fibers or substrates of the decorative sheet was exposed is 1000 g or less, and was evaluated as "Good" when the minimum load was 1500 g or more.

TABLE 1

| | Scratch resistance | | |
| --- | --- | --- | --- |
| | Hoffman scratch | Pencil hardness | Coin scratch |
| Example | Good | Good | Good |
| Comparative Example | Poor | Poor | Poor |

As understood from the result in Table 1, the scratch resistance of the decorative sheet of the Example is excellent in all of the Hoffman scratch test, the pencil hardness test, and the coin scratch test.

[Reference Signs List] 1: Decorative plate; 2: Decorative sheet; 3: Substrate; 4: Sheet base material; 5: Pattern layer; 6: First surface protective layer; 7: Second surface protective layer; 10: Decorative plate; 11: Decorative sheet; 12: Matting layer; 13: First surface protective layer; 14: Inorganic particles or synthetic resin particles.

What is claimed is:
1. A decorative sheet, comprising:
a pattern layer formed on a sheet base material, a first surface protective layer formed on the pattern layer, and a second surface protective layer partially formed on the first surface protective layer, wherein
the first surface protective layer and the second surface protective layer each have a gloss different to each other, and
the sheet base material is a thin paper that has a T-type peeling strength of 130 gf/15 mm or more and 210 gf/15 mm or less and an air permeability in accordance with JIS P 8117 of 150 seconds or more, wherein the second surface protective layer is an outermost layer of the decorative sheet.

2. The decorative sheet of claim 1, wherein the sheet base material has a basis weight of 20 g/m² or more.

3. The decorative sheet of claim 1, wherein
the first surface protective layer contains a thermosetting resin having a urethane bond, and
the second surface protective layer contains either a thermosetting resin having a urethane bond or an ionizing radiation curable resin, the second surface protective layer covering 0.1% or more and 30% or less of an area of the first surface protective layer.

4. The decorative sheet of claim 1, wherein a gloss of the second surface protective layer has gradation.

5. The decorative sheet of claim 1, wherein the first surface protective layer contains a thermosetting resin having a urethane bond, and silica particles.

6. The decorative sheet of claim 1, wherein the second surface protective layer contains a thermosetting resin having a urethane bond.

7. A decorative sheet, comprising:
a pattern layer formed on a sheet base material and a first surface protective layer formed on the pattern layer, wherein
the decorative sheet contains, on the outermost surface of the first surface protective layer, inorganic particles or synthetic resin particles, having an average particle size of 40 μm or more and 80 μm or less,
the inorganic particles or the synthetic resin particles are exposed on a surface of the decorative sheet at an area ratio of 10% or more and 20% or less, and
the surface of the decorative sheet has a coefficient of static friction of 0.11 or more and 0.15 or less, wherein the first surface protective layer is the only surface protective layer of the decorative sheet.

8. The decorative sheet of claim 7, wherein
the first surface protective layer reflects 5% or more and 10% or less of light inputted thereinto at 60°, and
a matting layer is further disposed between the first surface protective layer and the pattern layer, the matting layer containing a coarse extender pigment having a particle size of 5 μm or more and 20 μm or less, the matting layer reflecting 1% or more and 4% or less of light inputted thereinto at 60°.

9. A decorative plate wherein the decorative sheet of claim 1 is bonded to a substrate.

10. The decorative sheet of claim 1, wherein the second surface protective layer consists of a thermosetting resin having a urethane bond.

11. The decorative sheet of claim 1, wherein the second surface protective layer consists of a thermosetting resin.

12. The decorative sheet of claim 1, wherein the second surface protective layer consists of an ionizing radiation curable resin.

13. The decorative sheet of claim 1, wherein the second surface protective layer consists of a mixture of a thermosetting resin and an ionizing radiation curable resin.

* * * * *